United States Patent Office 3,513,790
Patented May 26, 1970

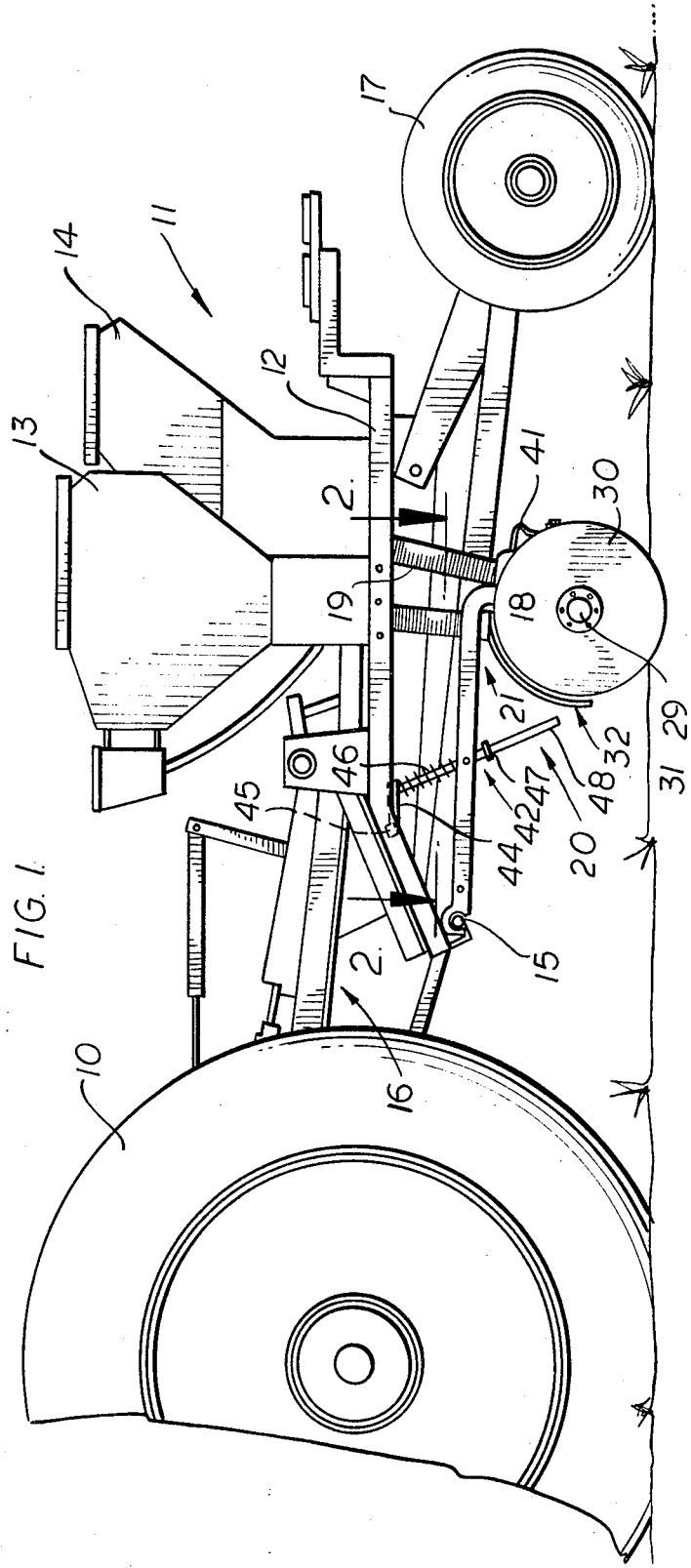
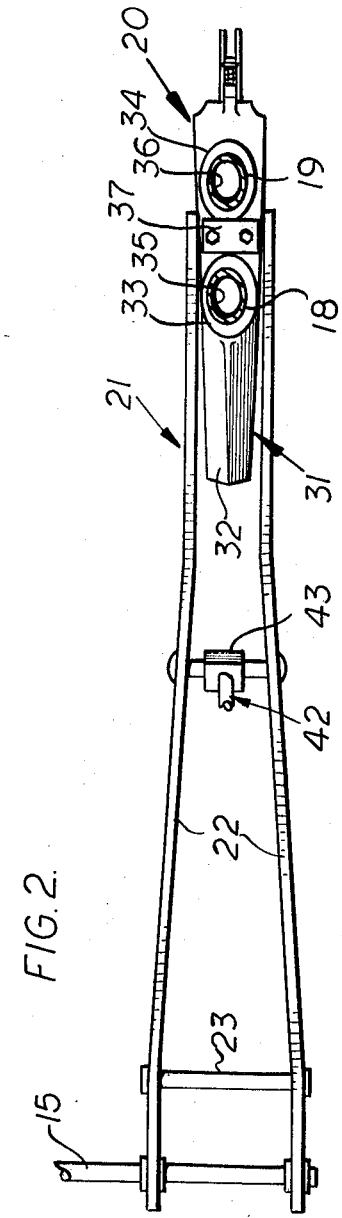

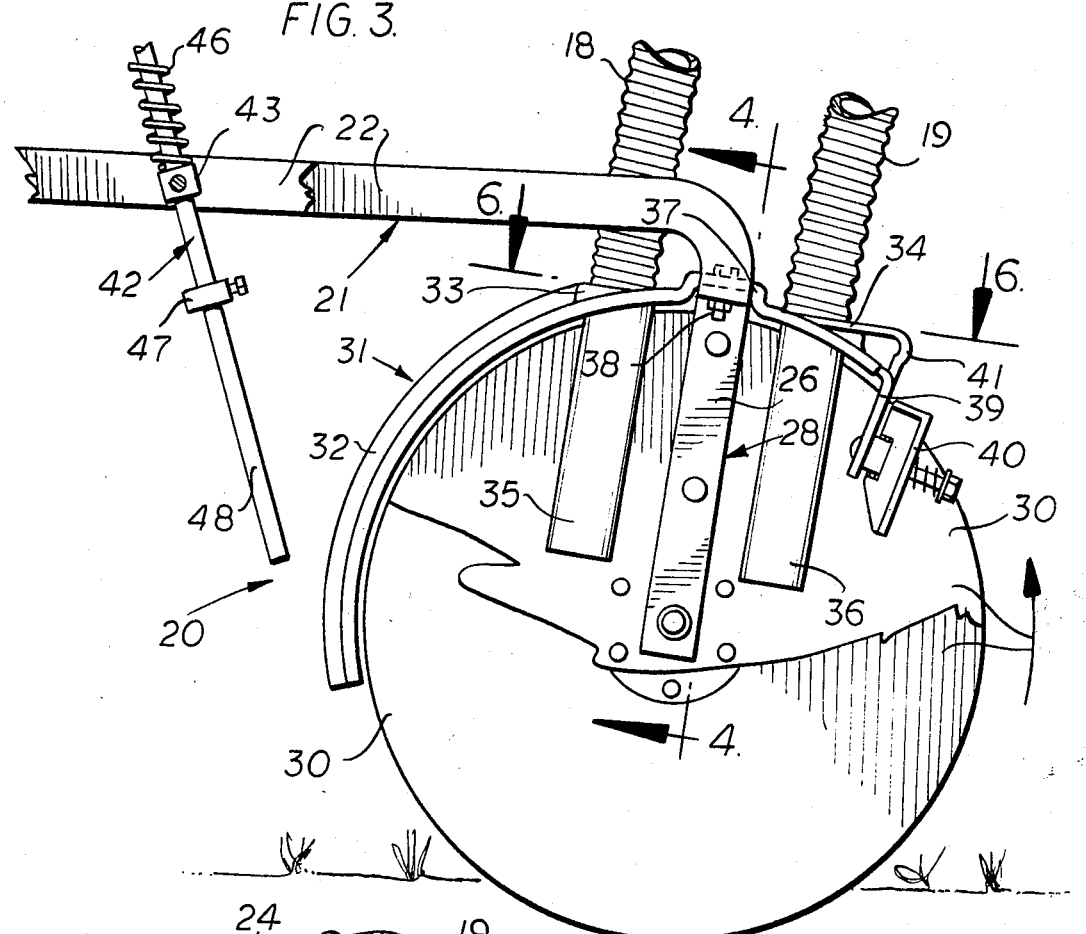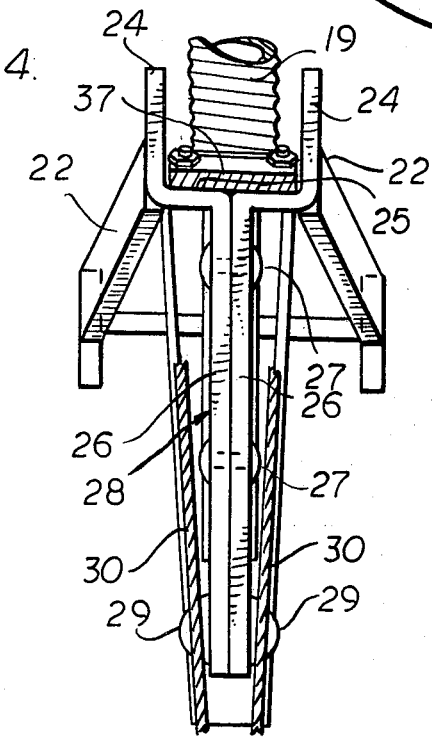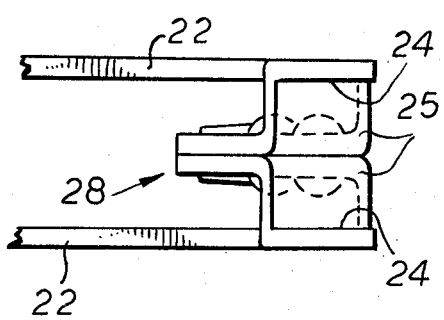

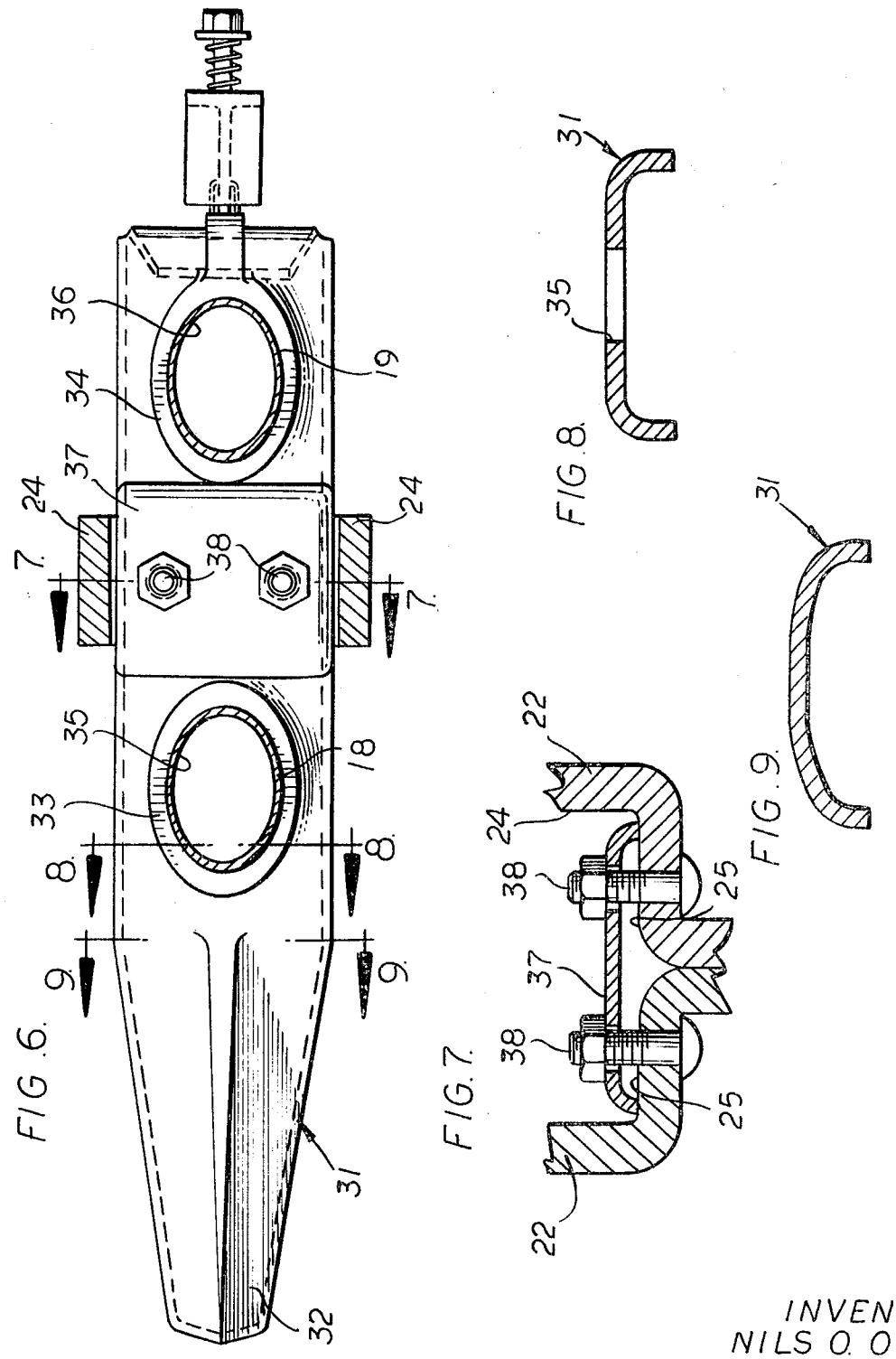

3,513,790
FURROW OPENER ASSEMBLY
Nils O. Olsson, Ancaster, Ontario, Canada, assignor to International Harvester Company, Chicago, Ill., a corporation of Delaware
Filed July 12, 1968, Ser. No. 746,702
Int. Cl. A01c 5/06
U.S. Cl. 111—88
5 Claims

ABSTRACT OF THE DISCLOSURE

A double disk furrow opener assemby for grain drills and the like wherein the conventional cast boot and connected drawbar have been replaced by a drawbar the rear end of which is bent downwardly to form the disk support, and a sheet metal cover for the upper portion of the disks has openings to receive the flexible seed and fertilizer tubes, the lower ends of which extend downwardly between the disks and take the place of the cast iron tubes forming part of the conventional cost boot.

BACKGROUND OF THE INVENTION

This invention relates to furrow openers for grain drills and the like and particularly to a double furrow opener.

In conventional double disk furrow openers a cast iron boot of awkward and heavy construction includes a part covering the space between the upper portions of the disks and a part on which the disks are mounted. Also formed in the casting are tubular portions to which the lower ends of the flexible hose from the grain and fertilizer hoppers are connected and which conduct grain and fertilizer between the disks to the ground. Bolt openings are provided in the casting for connecting drawbars thereto.

The present invention has for its objects the provision of a lightweight, simple and economical unitary drawbar and disk support wherein the rear end of the drawbar is bent downwardly and the disks are mounted on the lower end thereof. A formed sheet metal cover is secured ot the drawbar and spans the space between the upper edges of the disks and is provided with simple cutouts to receive the flexible grain and fertilizer tubes, the lower ends of which extend downwardly and eliminate the rigid tubes formed in the conventional cast boot.

DESCRIPTION OF THE DRAWINGS

FIG. 1 is a diagrammatic side elevation of the rear end of a tractor having connected thereto a grain drill incorporating the features of this invention;

FIG. 2 is a sectional view taken on the line 2—2 of FIG. 1;

FIG. 3 is an enlarged detail in side elevation, with parts broken away showing a part of the drawbar and double disk furrow opener assembly of this invention;

FIG. 4 is a section on line 4—4 of FIG. 3;

FIG. 5 is a plan view of a portion of the drawbar;

FIG. 6 is an enlarged section taken on the line 6—6 of FIG. 3;

FIG. 7 is a section on the line 7—7 of FIG. 6;

FIG. 8 is a section on the line 8—8 of FIG. 6; and

FIG. 9 is a section on the line 9—9 of FIG. 6.

DESCRIPTION OF THE PREFERRED EMBODIMENT

FIG. 1 shows the rear end of a tractor 10 to which is connected a grain drill 11, many of the constructional details of which form no part of this invention. However, it may be understood that a generally rectangular frame member 12 supports transversely elongated hoppers 13 and 14 for grain and fertilizer, the forward end of frame 12 being bent downwardly and supporting a transversely extending shaft 15. The forward end of the implement includes hitch means 16 for connecting and supporting the implement on the tractor. The rear end of the implement is supported by two or more wheels 17.

Grain and fertilizer discharged from hoppers 13 and 14 pass through flexible tubes 18 and 19 and are directed to a double disk furrow opener unit 20.

The furrow opener assembly 20 includes a drawbar portion 21 comprising laterally spaced bar sections 22 disposed generally horizontally. The drawbar sections 22 diverge forwardly and are secured together by a brace 23. The forward ends of the drawbar sections 22 beyond brace 23 are provided at their lower ends with notches for pivotal connection of the drawbar to shaft 15.

As shown in FIGS. 3, 4, and 5, the rear ends of drawbar sections 22 are bent downwardly and offset inwardly to form sides 24 and a horizontal shoulder portion 25, the downwardly extending end portions 26 being secured together by bolts or rivets 27 and forming a leg 28. The lower end of leg 28 is provided with bearings 29 for the mounting thereon of laterally spaced downwardly converging furrow opener disks 30.

The space between the upper edges of the disks is spanned by a wrap-around cover member 31 conforming to the curvature of the disks and including a forward channel-shaped trash deflector portion 32, and a pair of longitudinally spaced bosses 33 and 34 defining openings 35 and 36 to receive grain and fertilizer tubes 18 and 19, respectively. The lower ends of tubes 18 and 19 form cylindrical ducts 35 and 36 extending downwardly between the disks for discharging material into the furrow formed thereby.

A portion of cover 31 between tubes 18 and 19 is offset upwardly to form a bridge 37 resting upon shoulder 25 and secured thereto by bolts 38.

The rear end of the cover member is bent downwardly and radially inwardly to provide a tailpiece 39 to which is secured a scrapper blade 40 engageable with the inner surfaces of the disks, and the upper portion of the tailpiece is formed into a hook portion 41 to which, if desired, may be attached drag chains and the like.

Down pressure is exerted on the furrow opener assembly by the provision of a downwardly and rearwardly directed rod 42 slidably received in a swivel 43 pivotally mounted between drawbar sections 22. The upper end of rod 42 is connected to arm 44 affixed to a rockshaft 45 mounted in well-known manner on the implement frame. A spring 46 surrounds the rod between arm 44 and swivel 43, and a collar 47 limits the sliding of rod 42 in swivel 43 in one direction.

The lower end of rod 42 is extended to a location near the forward edge of disks 30 and functions as a deflector 48 to engage trash and deflect it from the disks and help prevent clogging thereof.

It is believed that the construction and operation of the double disk furrow opened assembly of this invention will be clearly understood from the foregoing description. It should likewise be understood that the invention has been described in its preferred embodiment and that modifications may be made therein without departing from the spirit of the invention or the scope of the appended claims.

What is claimed is:

1. In a grain drill or the like having a supporting frame and one or more tubes for discharging material to the ground, a double disk furrow opener assembly comprising a drawbar including a pair of laterally spaced longitudinally extending drawbar sections having forwardly extending means for connection to the frame for vertical movement of said drawbar sections relative thereto, the rear ends of said sections being offset inwardly and directed downwardly in substantially abutting relationship to form a horizontal shoulder portion and a generally vertical leg portion, a pair of disks rotatably mounted on opposite sides of said leg portion, and a longitudinally extending sheet metal cover member secured medially of its ends to said shoulder portion, said cover member having a forward downwardly curved trash guard portion conforming to the curvature of the disks and generally spanning the space therebetween to prevent trash entering between the disks during operation and said cover member having openings therein to receive said tubes.

2. The invention set forth in claim 1, wherein the rear end of said cover member is bent downwardly and radially inwardly between said disks and has secured thereto a scraper blade in operative relation to the inner surfaces of said disks.

3. The invention set forth in claim 1, wherein said cover member is channel shaped in cross-section.

4. The invention set forth in claim 1, wherein a lift arm pivoted on the supporting frame is pivotally connected to a rod having a sliding cushioned connection to said drawbar at a location in advance of said disk assembly, said rod having a lower end extension directed downwardly and rearwardly to a location adjacent the forward peripheries of said disks to deflect trash prior to engagement thereof by the disk assembly.

5. The invention set forth in claim 1, wherein said tubes extend downwardly through said openings to a location close to the ground to reduce the tendency of the discharged material to scatter.

References Cited

UNITED STATES PATENTS

| | | | |
|---|---|---|---|
| 736,369 | 8/1903 | Dynes et al. | 111—88 |
| 770,185 | 9/1904 | Mitchell | 111—88 |
| 1,017,319 | 2/1912 | Rieske | 111—88 |
| 1,184,508 | 5/1916 | Beeman et al. | 111—88 |
| 1,263,174 | 4/1918 | Welch | 172—515 |

ROBERT E. PULFREY, Primary Examiner

R. C. HARRINGTON, Assistant Examiner

U.S. Cl. X.R.

111—80